(12) United States Patent
Letschert

(10) Patent No.: US 6,673,473 B2
(45) Date of Patent: Jan. 6, 2004

(54) DISPLAY SCREEN, IN PARTICULAR A COLOR DISPLAY SCREEN, COATING OF THE SAME AND MEANS FOR PRODUCING THE COATING

(75) Inventor: Hans-Peter Letschert, Hanau (DE)

(73) Assignee: Ferro GmbH, Frankfurt am Main (DE)

( * ) Notice: Subject to any disclaimer, the term of this patent is extended or adjusted under 35 U.S.C. 154(b) by 55 days.

(21) Appl. No.: 10/003,467

(22) Filed: Nov. 21, 2001

(65) Prior Publication Data

US 2002/0090560 A1 Jul. 11, 2002

(30) Foreign Application Priority Data

Dec. 13, 2000 (EP) .............................. 00127320

(51) Int. Cl.$^7$ ............................ G03C 5/00; H05B 33/00
(52) U.S. Cl. ...................... 428/690; 428/917; 430/25; 430/28; 420/535; 313/506
(58) Field of Search ................................ 428/690, 917; 430/25, 28; 313/506; 420/535

(56) References Cited

U.S. PATENT DOCUMENTS

| | | | |
|---|---|---|---|
| 5,376,349 A | | 12/1994 | Jansen et al. |
| 5,569,322 A | * | 10/1996 | Jansen et al. ............... 106/401 |
| 6,235,103 B1 | | 5/2001 | Letschert et al. |
| 6,294,009 B1 | * | 9/2001 | Letschert et al. ............ 106/401 |
| 6,379,449 B1 | * | 4/2002 | Jansen et al. ............... 106/401 |
| 6,517,741 B1 | * | 2/2003 | Feldmann et al. ...... 252/301.45 |

FOREIGN PATENT DOCUMENTS

| | | | |
|---|---|---|---|
| EP | 1020509 A1 | | 7/2000 |
| JP | 08-302342 | * | 11/1996 |
| JP | 2000-243312 | * | 9/2000 |

OTHER PUBLICATIONS esp database Abstract for EP1020509 published Jul. 19, 2000.

* cited by examiner

Primary Examiner—Cynthia H. Kelly
Assistant Examiner—Dawn L. Garrett
(74) Attorney, Agent, or Firm—Rankin, Hill, Porter & Clark LLP

(57) ABSTRACT

The invention relates to a display screen, in particular a color display screen, based on a display screen support with a single-layer or multi-layer coating which contains a red luminous substance and a coloring pigment. The invention is furthermore directed towards the display screen coating, means for the production thereof and a coated red luminous substance capable of being used for this purpose. A feature of the invention, is the presence of red tantalum (V) nitride by way of pigment for the purpose of increasing the contrast and decreasing the reflection of the display screen.

14 Claims, No Drawings

DISPLAY SCREEN, IN PARTICULAR A COLOR DISPLAY SCREEN, COATING OF THE SAME AND MEANS FOR PRODUCING THE COATING

The invention relates to a display screen, in particular a colour display screen, based on a display-screen support with a single-layer or multi-layer coating which contains a red luminous substance and a colouring pigment. The invention is further directed towards a single-layer or multi-layer display-screen coating, means for producing the display-screen coating, including the production of a coated red luminous substance. Further subjects are directed towards the production of the display screen and its coating and also to the production of the coated luminous substance.

Display screens, such as colour display screens, colour monitors and plasma display panels, are frequently utilised in relatively bright ambient light. In order to make the screen image more visible in such illumination and in order to tire the eyes less, the display screen should be free from glare, low in reflection and rich in contrast. The contrast can be maximised by increasing [sic] the influence of external light in comparison with the intrinsic luminous density of the luminous substances in the display-screen coating. This can be obtained, for example, by virtue of colour filters in the form of inorganic pigments which are selected in such a way that they are as transparent as possible in respect of the colour emitted by the respective luminous substance and absorb the remaining portions of the spectrum, so that the diffuse reflection of the external light on the luminous-substance powder is suppressed.

A colouring pigment that, with a view to achieving the filtering effect, is suitable for use in an image layer or filter layer or for the pigmentation of a luminous substance has to have absorption properties that do not have a negative influence on the emission characteristic of the luminous substance. Moreover, a requirement of a pigmentation in an image layer or filter layer or for luminous-substance coatings is that it is stable in a vacuum, is not degraded by electron bombardment or gas discharges, is inert in relation to reducing, oxidizing or hydrolysing reagents and does not decompose at elevated temperature.

From published German patent application DE-OS 199 01 539 a colour display screen is known with a red luminous substance and a red to yellow oxide-nitride pigment corresponding to the formulae stated in said document. Suitable are, for example, oxide nitrides of the general formula $A_{1-x}A'_xBO_{2-x}N_{1+x}$ with A=Mg, Ca, Ba, Sr, Zn, A'=La or another lanthanide element, Bi, Al, Fe; B=V, Nb, Ta, Mo, W and 0<x<1. The pigment is contained in a coating containing binding agent on the red luminous substance. Such an oxide nitride and a red luminous substance in the coating of a colour display screen provide a high-contrast and low-reflection image. Although the colour can be varied within the range from yellow to red—and hence the absorption spectrum can also be varied—through the choice of the O/N ratio in the oxide nitride, it is a question of very complex compounds; in addition, there only exists a supply of red pigments for red luminous substances.

The object of the invention is accordingly [sic] a further display screen, in particular a colour display screen, with a display-screen coating containing a red luminous substance and a red pigment. The red pigment should have a simpler chemical structure than the oxide nitrides that are known for this purpose with three or more cations. In addition, the pigment should be distinguished by an absorption edge that is as sharp as possible. The display screen with the red pigment should provide a high-contrast image, should possess low reflectance in respect of external light and should exhibit high emission luminance and good emission-colour quality.

The stated objects [sic], as well as further objects such as result from the further specification, are achieved by the subjects as claimed.

A display screen, in particular a colour display screen, has been found comprising a display-screen support and a single-layer or multi-layer display-screen coating which contains a red luminous substance and a colouring pigment, said display screen being characterised in that tantalum(V) nitride ($Ta_3N_5$), which may be coated with an oxidic material, is present by way of colouring pigment.

The dependent claims are directed towards preferred embodiments. Further claims are directed towards the coating, means for the production thereof, coated luminous substances and the production thereof. An essential feature of the invention in all embodiments is the presence of red tantalum(V)-nitride pigment ($Ta_3N_5$), which may also be coated. Tantalum(V) nitride is accordingly a means for producing the display screen as well as the coated luminous substances.

Tantalum(V) nitride for use in a display screen according to the invention and for the production of coated luminous substances can be obtained by nitriding an oxidic tantalum (V) compound with dry ammonia. According to EP 0 592 867 B1, tantalum(V) oxide hydrate of the formula $Ta_2O_5 \cdot aq$ is nitrided. A better pigment quality is achieved by nitriding tantalum(V) oxide in the presence of an oxide such as $SiO_2$—EP 1 031 536 A1.

According to a first embodiment, tantalum(V) nitride is located in a colour-filter layer which is arranged between a display-screen layer containing the red luminous substance and the display-screen support or the display-screen support which is covered with a black matrix.

According to a second embodiment, the $Ta_3N_5$ pigment and the red luminous substance are located jointly side by side in a display-screen layer.

According to a third, particularly preferred embodiment, tantalum(V) nitride is located in an inorganic or organic coating on the red luminous-substance particles. The display-screen coating contains the luminous-substance particles that have been coated in this way in the active display-screen layer, which in turn is arranged directly on the display-screen support or on a display-screen support which is coated with a black matrix and/or with one or more filter layers.

In the case of the material of the display-screen support it is a question of a material that is stable under the operating conditions of the display screen, such as vacuum, electron radiation, gas discharges. Examples are glass, ceramic, metal and glazed metals; in particularly preferred manner the display-screen support consists of glass. In expedient manner a display-screen support made of glass is covered on the reverse with a metal film such as an aluminium film.

Preferred colour display screens contain, in one or more layers, luminous substances in the primary colours blue, red and green and, in addition, at least one pigment in one of the primary colours, preferably a pigment in each of all three primary colours. According to the invention, in the case of the red pigment it is a question of tantalum(V) nitride. According to a preferred embodiment of a display screen according to the invention, the active image layer contains a coated red luminous substance with tantalum(V)-nitride pigment in the coating. As needed, the blue and/or green luminous substances are also coated with a blue or green pigment, respectively. As an alternative to this, the pigments that are matched to the respective luminous substance may be present side by side in a filter layer.

A colour display screen with a red luminous substance and with a tantalum(V)-nitride pigment provides a high-contrast and low-reflection image, because the absorption properties of tantalum(V) nitride suit the emission properties of common red-luminescent luminous substances very well. The known state of the art provides no inducement to use pure and more readily accessible tantalum(V) nitride, which may also be coated, instead of oxide nitrides.

Tantalum(V) nitride is distinguished, in comparison with traditional $Fe_2O_3$ pigments, by a steeper absorption edge in the red-orange spectral range and by a high absorptivity and constitutes an alternative to the oxide nitrides. Therefore the pigment-containing layers can be kept thin and the amount of pigment can be kept small. The tantalum(V)-nitride pigments according to the invention are easy to produce and can readily be incorporated into an image layer or a filter layer or into a luminous-substance coating. They adhere well on the surface of the known red luminous substances. They are resistant to electron radiation and gas discharges, have a very low vapour pressure, sufficient temperature resistance up to 700° C. and are non-toxic.

A display screen according to the invention, in particular a colour display screen, the display-screen coating as well as a coated luminous substance according to the invention comprise a red luminous substance. Known red-luminescent luminous substances can be used for the invention. Examples are doped oxide halides such as YOCl:Eu, YOBr:Eu, LaOF:Eu, or oxides such as CaO:Eu, $Y_2O_3$:Eu, $La_2O_3$:Eu, $ThO_2$:Eu, or borates such as $MgB_2O_4$:Mn, $SrB_2O_4$:Sm, $MgYBO_4$:Eu, $LaBO_3$:Eu, $LaAl_3B_4O_{12}$:Eu, $YAl_3B_4O_{12}$:Eu, or aluminates such as $LiAlO_2$:Fe, $YalO_3$:Eu, or silicates such as $Ca_2MgSi_2O_7$:Eu, Mn [sic], or phosphates such as $Zn_3(PO_4)_2$:Mn, $MgBaP_2O_7$:Eu, Mn [sic], or sulfates such as $SrSO_4$:Bi or molybdates, tungstates or vanadates such as $CaMoO_4$:Eu, $La_2W_3O_{12}$:Eu, $YVO_4$:Eu, $LaVO_4$:Eu, or sulfides and oxide sulfides such as ZnS:Mn, Te [sic], ZnS:Sn, CaS:Eu, $ZnGa_2S_4$:Mn, $Y_2O_2S$:Eu.

Depending on the particle size of the tantalum(V)-nitride pigment, the colour-filter layers produced with it are transparent, translucent or non-transparent. Tantalum(V)-nitride pigments with a particle size that is small enough to form at least partially transparent layers can be applied not only for the pigmentation of the luminous substances but also as a separate colour-filter layer between display-screen glass and luminous-substance layer. A mean particle size of less than 1 $\mu$m is expedient.

The invention also provides a red luminous substance with a coating containing tantalum(V) nitride. In expedient manner the particle size of $Ta_3N_5$ is so small that the coating is transparent or translucent in respect of the light emitted from the luminous substance. The particle size of the $Ta_3N_5$ pigment is preferably less than 1 $\mu$m, in particular around/below 0.5 $\mu$m. The quantitative ratio of $Ta_3N_5$ pigment to red luminous substance lies ordinarily within the range from 1 to 1,000 to 1 to 10, but values outside these limits are not excluded. In particularly preferred manner the ratio lies within the range from 1 to 500 to 1 to 50. The coating of the red luminous substance contains, besides the red $Ta_3N_5$ pigment, an inorganic or organic binding agent, with the aid of which the pigment is fixed to the luminous substance. Hence in the case of application in a colour display screen an optimal result is achieved with respect to richness of contrast and absence of reflection.

The production of the coated red luminous substance containing $Ta_3N_5$ pigment comprises the following stages: joint or separate suspending of tantalum(V)-nitride pigment and red luminous substance in the presence or absence of an inorganic or/and organic binding agent or precursor of such a binding agent in an aqueous medium and, if separate suspension was [sic] produced, combining the same, whereby the suspension containing tantalum(V) nitride and red luminous substance for the purpose of forming the luminous-substance coating and fixing the pigment in said coating an inorganic and/or organic binding agent or binding-agent precursor is present [sic], in the case of the presence of a binding-agent precursor, setting of conditions for converting the precursor into the binding agent, separating the solids from the aqueous phase and drying the solids.

The process consequently comprises a mechanical comminution of agglomerated particles. Pigment and luminous substance are preferably deagglomerated separately from one another in the presence of a binding agent, and in this way stable suspensions are produced. Binding agents for fixing the pigment on the luminous substance are of inorganic and/or organic nature. In the case of the binding agents it is a question of systems familiar to a person skilled in the art, which are capable of forming a coherent layer in the course of drying or as a result of a condensation reaction of layer-forming precursors. In the case of the organic binding agent it is a question, in particular, of polymers selected from the series comprising gelatine, acrylic-acid and methacrylic-acid polymers and copolymers, melamine resins, urea resins, polyurethanes and polyesters. The inorganic binding agents are to be understood to include, in particular, those based on oxides, such as silica. A silica layer is formed in this case from a suitable precursor, such as water glass or an alkoxysilane, by hydrolysis and condensation being brought about by pH adjustment and/or thermal treatment.

A preferred implementation of the production of coated luminous substances comprises the following steps: red luminous substances, such as $Y_2O_2S$:Eu for example, are deagglomerated in alkaline solution (pH 8.5 to 9.5) with suitable grinding aids. In this process the addition of alkali-metal silicates (0.01 to 0.1 wt. %), small-particle colloidal $SiO_2$ (0.01 to 0.1 wt. %, particle diameter: 10 to 40 nm) or organic polymers (gelatine, acrylic acids, melamine resins, urea resins, polyurethanes etc., 0.01 to 0.1 wt. %) can be helpful. After the deagglomeration the luminous-substance suspension is stable in the neutral to weakly alkaline pH range. The tantalum(V)-nitride pigments listed above are likewise deagglomerated with suitable grinding elements and addition of alkali-metal silicates (0.01 to 0.05 wt. %, relative to the luminous substance to be pigmented), small-particle colloidal $SiO_2$ (0.01 to 0.05 wt. %, relative to the luminous substance to be pigmented, particle diameter: 10 to 40 nm) and/or an organic polymer (gelatine, acrylic acids, melamine resins, urea resins, polyurethanes; 0.01 to 0.1 wt. %, relative to the luminous substance to be pigmented).

According to a further embodiment, which is suitable both for the production of the display screen according to the invention and for producing $Ta_3N_5$-containing coated luminous substances, the tantalum(V)-nitride pigment is employed in the form of a pigment that has already been covered with a thin oxide layer. Such a covering results in enhanced temperature stability of the pigment (this is significant in the case where the pigment is used in a decoration system to be stoved). In the case of the coating it may be a question, in particular, essentially of oxides selected from the series comprising $SiO_2$, $GeO_2$, $SnO_2$, $ZrO_2$, $HfO_2$ or of mixed oxides. Suitable oxide precursors are, for example, dialkoxy, trialkoxy or tetra-alkoxy compounds of the stated elements, as well as solutions of the oxides in lye. In the field of application, according to the invention, of the oxide-enveloped $Ta_3N_5$ pigment it is a question, in the case of the oxide, preferably of $SiO_2$; oxides with high refractive index are less suitable.

With a view to coating the luminous substance, the latter is firstly coated—unless this has already happened in the course of the deagglomeration—with a binder that guarantees the adhesion of the pigment. By way of binder systems, those may be employed such as are also in use for the traditional pigmentation of red luminous substances with $Fe_2O_3$. These may be, as already stated, inorganic oxides or precursors for such oxides, but also organic polymers such as gelatine, acrylic acids, melamine resins, urea resins, polyurethanes. In the case of a neutral pH value, subsequent to this a stable pigment suspension may be added slowly dropwise to the luminous-substance suspension. After some time the pigment adheres reliably to the surface of the luminous substance. In conclusion, the pigmented luminous substance can be covered with further inorganic oxides, precursors thereof or organic polymers.

With a view to production of the colour display screen, which is familiar to a person skilled in the art, the glass of the colour display screen is, for example, firstly covered with a template of a black matrix by means of a photolithographic process. Lattices of the three primary colours blue, red and green are then applied in accordance with the known processes, using suspensions of pigmented luminous substances in three consecutive photolithographic steps. Alternatively, the red luminous substance and $Ta_3N_3$ may also be present side by side in a suspension. Alternatively, the luminous substances may also be applied in a single printing process.

In the case where a colour-filter layer is employed between the glass of the colour display screen and the layer(s) of luminous substance, the luminous substances are not pigmented. Instead, in a separate step a layer of the $Ta_3N_5$ pigment is applied on the screen glass in such a manner that said layer is positioned between the screen glass and the corresponding luminous-substance lattice.

Application may be effected by photolithographic means, using suspensions of the tantalum(V)-nitride pigments or alternatively by a printing process.

For normal applications in colour-television picture tubes or colour monitors, the finished colour-display-screen coating comprising all three colours and possible colour-filter layers can be provided on the reverse with an aluminium film and finally fitted so as to produce the finished tube.

The subjects according to the invention are distinguished by their high efficiency with respect to reducing reflection and increasing contrast. The means to be used in accordance with the invention, namely tantalum(V) nitride, is readily available and exhibits a suitable sharp absorption edge in respect of red luminous substances.

EXEMPLARY EMBODIMENT 1

A stable suspension of a tantalum(V)-nitride pigment is obtained if 3.2 g tantalum(V) nitride are mixed with 120 ml of demineralised water and 3 ml of a 15-% potassium-silicate solution and subjected to wet grinding for 4 days. Moreover, 800 g of red $Y_2O_2S$:Eu luminous-substance powder are coarsely sieved and washed several times with demineralised water. The luminous substance that has been purified in this way is topped up with demineralised water to form a suspension with a volume of 1 l. The pH value of the suspension is adjusted to a value of 9.3 with 2-molar caustic-soda solution. Furthermore, 8 ml of a suspension with 3 wt. % $SiO_2$ with a particle diameter from 10 to 40 nm are added. The combined suspensions are stirred for 30 min, subsequently grinding elements are added and wet grinding is effected for 2 h. After separation of the grinding elements a stable suspension with a volume of 3 l is obtained, the pH value of which is adjusted to 7.0 with 2-molar hydrochloric acid. The suspension is stirred for a further 30 min and then added to a solution of 2.17 g zinc acetate dihydrate in 50 ml water. Subsequently the pH value is raised slowly to 9.3 with 2-molar caustic-soda solution. After stirring for 30 minutes, a pH value of 7.3 is adjusted with 2-molar hydrochloric acid. After a further 30 min the suspension of the tantalum(V)-nitride pigment is slowly added dropwise, subject to stirring. The pH value is meanwhile maintained within a range from 6.8 to 7.5. The suspension is stirred for a further hour, the pigmented $Y_2O_2S$:Eu luminous substance is allowed to settle and filtering-off is effected. The filter cake is subsequently washed three times, each time with 100 ml of demineralised water. The coated luminous substance is then dried for 15 h at 140° C. and sieved through a sieve with a mesh width of 36 µm.

EXEMPLARY EMBODIMENT 2

Stable suspensions with a red-luminous $Y_2O_2S$:Eu luminous-substance powder and also with a tantalum(V)-nitride pigment are produced as described in Exemplary Embodiment 1. After stirring for 30 minutes, a solution of 0.8 g gelatine in 200 ml of warm water is added to the stable luminous-substance suspension (pH value: 6.8 to 7.2). After a further 30 minutes the stable pigment suspension is added slowly dropwise, subject to stirring. The pH value is maintained during the entire time within a range from 6.8 to 7.5. The suspension is stirred for a further hour, the pigmented $Y_2O_2S$:Eu luminous substance is allowed to settle and filtering-off is effected. The filter cake is subsequently washed three times, each time [sic] 100 ml of demineralised water. The coated luminous substance is then dried for approximately 15 h at 140° C. in contact with the air and sieved by means of a steel sieve (pore width 36 µm).

What is claimed:

1. A display screen, comprising:
    a display screen support and a single-layer or multi-layer display screen coating disposed on the display screen support, the display screen coating comprising a red luminous substance and a coloring pigment, the coloring pigment comprising tantalum (V) nitride ($Ta_3N_5$).

2. The display screen according to claim 1, wherein the display screen coating is multi-layer and further comprises a color filter layer and a display screen layer,
    the color filter layer comprising the coloring pigment and the display screen layer comprising the red luminous substance,
    the color filter layer being arranged between the display screen support, and the display screen.

3. The display screen according to claim 1, wherein the display screen coating is multi-layer and further comprises a second luminous substance in one or more image layers in one of the primary colors of blue, red and green.

4. The display screen according to claim 2, wherein the red luminous substance has a coating, and the red luminous substance coating comprises tantalum (V) nitride.

5. The display screen according to claim 4, wherein the display screen coating comprises a lattice with primary colors of blue, red and green, and wherein the red luminous substance comprises tantalum (V) nitride.

6. The display screen according to claim 4, wherein the tantalum (V) nitride in the red luminous substance coating is in the color filter layer and has a mean particle diameter of less than 1 μm and a coating thickness sufficient to allow transparency or partial transparency of the display screen.

7. The display screen according to claim 1, wherein the display screen support consists essentially of glass, and the display screen coating comprises a black-matrix layer arranged directly on the glass display screen support.

8. A display screen coating, comprising at least one layer, and a red luminous substance and a coloring pigment, the red luminous substance and the red coloring pigment being in a single or different layers relative to each other, and, wherein the coloring pigment comprises tantalum (V) nitride ($Ta_3N_5$).

9. A coated red luminous coloring substance, comprising tantalum (V) nitride ($Ta_3N_5$).

10. The coated red luminous coloring substance according to claim 9, wherein the coating of the luminous substance comprises a cured inorganic and/or organic binding agent.

11. The coated red luminous coloring substance according to claim 9, wherein the red luminous substance is a europium-doped inorganic compound selected from the series consisting of the oxide halides, oxides, borates, silicates, phosphates and sulfates or a Mn-, Te-, Sm- or Eu-doped sulfide, oxide sulfides and vanadates.

12. The coated red luminous coloring substance according to claim 9, wherein the weight ratio of tantalum (V) nitride to the total weight of the coated red luminous substance lies within a range of from about 1 to 1,000.

13. A process for producing a tantalum nitride-containing, coated red luminous substance according to claim 9, comprising joint or separate suspending of tantalum nitride pigment and red luminous substance in the presence or absence of an inorganic or/and organic binding agent or precursor of such a binding agent in an aqueous medium and, if separate suspension was produced, combining the same, whereby the suspension containing tantalum nitride and red luminous substance for the purpose of forming the luminous-substance coating and fixing the pigment in said coating an inorganic and/or organic binding agent or binding-agent precursor is present, in the case of the presence of a binding-agent precursor, setting of conditions for converting the precursor into the binding agent, separating the solids from the aqueous phase and drying the solids.

14. The coated red luminous coloring substance according to claim 12, wherein the weight ratio of tantalum (V) nitride to the total weight of the coated red luminous substance is in a range of from about 1 to 50.

* * * * *